US008438052B1

(12) United States Patent
Chanda et al.

(10) Patent No.: US 8,438,052 B1
(45) Date of Patent: May 7, 2013

(54) AUTOMATED SELECTION OF THREE OF MORE ITEMS TO RECOMMEND AS A BUNDLE

(75) Inventors: Gaurav Chanda, Seattle, WA (US); Brent R Smith, Redmond, WA (US); Ronald M Whitman, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 642 days.

(21) Appl. No.: 12/426,441

(22) Filed: Apr. 20, 2009

(51) Int. Cl.
*G06Q 40/00* (2012.01)

(52) U.S. Cl.
USPC ........................................................ 705/7.11

(58) Field of Classification Search ...................... 705/14
See application file for complete search history.

(56) References Cited

U.S. PATENT DOCUMENTS

| | | | |
|---|---|---|---|
| 5,909,023 A | 6/1999 | Ono et al. |
| 6,266,649 B1 | 7/2001 | Linden et al. |
| 6,356,879 B2 | 3/2002 | Aggarwal et al. |
| 6,438,579 B1 | 8/2002 | Hosken |
| 6,460,036 B1 | 10/2002 | Herz |
| 6,691,163 B1 | 2/2004 | Tufts |
| 6,782,370 B1 | 8/2004 | Stack |
| 6,912,505 B2 | 6/2005 | Linden et al. |
| 7,092,936 B1 | 8/2006 | Alonso et al. |
| 7,680,703 B1 | 3/2010 | Smith |
| 7,835,951 B1 | 11/2010 | Burger et al. |
| 7,974,888 B2 | 7/2011 | Kane et al. |
| 7,979,315 B2 | 7/2011 | Boler et al. |
| 8,117,085 B1 | 2/2012 | Smith |
| 2002/0019763 A1 | 2/2002 | Linden et al. |
| 2002/0045959 A1 | 4/2002 | Van Overveld et al. |
| 2002/0065721 A1 | 5/2002 | Lema et al. |
| 2002/0198882 A1 | 12/2002 | Linden et al. |
| 2003/0105682 A1 | 6/2003 | Dicker et al. |
| 2003/0208402 A1* | 11/2003 | Bibelnieks et al. ............. 705/14 |
| 2007/0192317 A1 | 8/2007 | Finley et al. |
| 2008/0004989 A1 | 1/2008 | Yi |
| 2009/0043665 A1 | 2/2009 | Tirumalareddy et al. |

OTHER PUBLICATIONS

Agrawal, R., Imielinski, T., and Swami, A., "Mining Association Rules between Sets of Items in Large Databases," Proceedings of the 1993 ACM SIGMOD International Conference on Management Data, pp. 207-216. (1993).
U.S. Appl. No. 12/134,076, filed Jun. 5, 2008, owned by the assignee of the present application (filing receipt, specification and drawings are submitted herewith).
R. Agrawal, et al. "Quest a project on database mining," Proceedings of the 1994 ACM SIGMOD International Conference on Management of Data, 1994, p. 514 (ISSN: 0163-5808).

(Continued)

*Primary Examiner* — Shay S Glass
(74) *Attorney, Agent, or Firm* — Knobbe, Martens, Olson & Bear, LLP

(57) ABSTRACT

Automated processes are disclosed for identifying bundles of three or more items to suggest to users. In one embodiment, item action data, such as item purchase data reflective of the item purchases of a user population, is used to detect pairwise (item to item) associations between particular items represented in an electronic catalog. These pairwise associations are then used (optionally in combination with other information) to select bundles of three or more items to recommend to users. The bundles may, for example, be suggested on item detail pages of the electronic catalog.

17 Claims, 5 Drawing Sheets

OTHER PUBLICATIONS

M. Gery and H. Haddad, "Evaluation of web usage mining approaches for user's next request prediction," Proceedings of the 5th International Conference on Extending Database Technology, pp. 3-17, 1996 (ISBN: 3-540-61057-X).

Zaiane, et al., "Discovery Web Access Patterns and Trends by Applying OLAP and Data Mining Technology on Web logs," Proceedings of IEEE International Forum on Research and Technology Advances in Digital Libraries, pp. 19-29, Apr. 22-24, 1998.

Co-owned, co-pending U.S. Appl. No. 11/694,745, filed Mar. 30, 2007 (filing receipt, specification and drawings enclosed).

Agrawal et al., "Mining Association Rules between Sets of Items in Large Databases," Proceedings of the 1993 ACM SIGMOD International Conference on Management Data, pp. 207-216. (1993).

Agrawal et al. "Quest a project on database mining," Proceedings of the 1994 ACM SIGMOD International Conference on Management of Data, 1994, p. 514 (ISSN: 0163-5808).

Gery et al., "Evaluation of web usage mining approaches for user's next request prediction," Proceedings of the 5th International Conference on Extending Database Technology, pp. 3-17, 1996 (ISBN: 3-540-61057-X).

Zaiane et al., "Discovery Web Access Patterns and Trends by Applying OLAP and Data Mining Technology on Web logs," Proceedings of IEEE International Forum on Research and Technology Advances in Digital Libraries, pp. 19-29, Apr. 22-24, 1998.

Co-owned, co-pending U.S. Appl. No. 10/864,288, filed Jun. 9, 2004 (filing receipt, specification and drawings submitted herewith).

\* cited by examiner

US 8,438,052 B1

AUTOMATED SELECTION OF THREE OF MORE ITEMS TO RECOMMEND AS A BUNDLE

BACKGROUND

A variety of data mining methods exist for automatically detecting relationships or associations between items stored or represented in a data repository. For example, in the context of an electronic catalog of items, data mining processes are commonly used to identify items that tend to be viewed, purchased, downloaded, or otherwise selected in combination. Different types of item relationships may be detected based on different types of user activity. For instance, a pair of items, A and B, may be identified as a likely complementary pair if a relatively large number of those who purchase A also purchase B.

A need exists, among other needs, in the data mining field to more effectively identify items that are useful in combination. Currently, some e-commerce web sites use purchase-based item relationships ("customers who bought A also bought B" or "customers who bought A also bought B and C") to automatically select pairs of items to suggest purchasing in combination. Some bundles of items are also defined or selected manually by a human operator.

DETAILED DESCRIPTION OF SPECIFIC EMBODIMENTS

Figure 1:
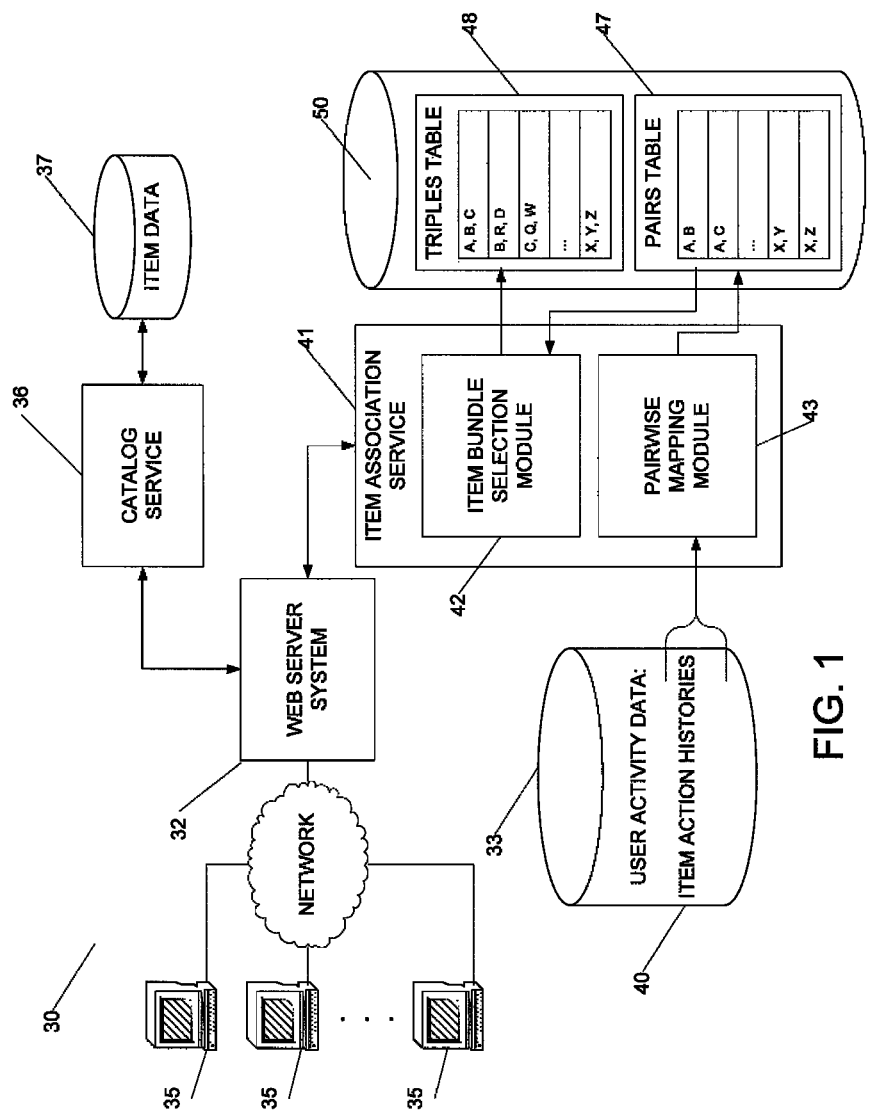
FIG. 1 depicts one embodiment of a system capable of collecting user activity data, and of mining the collected data to generate item bundling suggestions.

Specific embodiments will now be described with reference to the drawings. These embodiments are intended to illustrate, and not limit, the inventive subject matter set forth in the claims. Nothing in this detailed description is intended to imply that any particular feature, characteristic, or component of the disclosed systems and methods is essential.

I. Overview

Herein disclosed are systems and methods for identifying bundles of three or more items that are well suited for being purchased, acquired, or otherwise acted on in combination. Users may consider an item and that item may often be purchased with other items. This disclosure provides a process and system for automatically producing bundles of three or more items that are suggested to take action on together. In some embodiments, pairwise item relationship data is initially generated based (or based in part) on how frequently certain pairs of items are acted on (e.g., purchased) together. The pairwise item relationship data is then used to select groups of three or more items to suggest as a bundle. Taking action on items together may include purchases made within a certain time period of each other, rentals or downloads of the items within a certain time period of each other, or any other appropriate and related acquisition. Taking action on an item may also include adding an item to a wish list, clicking on a hyperlink associated with an item, viewing a video item, viewing an item detail page, viewing, purchasing, or downloading an electronic book, or any other trackable item-centric action.

For example, suppose that pairwise relationships are detected between items A and B, between items A and C, and between items B and C. (Such pairwise relationships may, for example, be identified based on co-occurrences of specific items in users' purchase histories using methods that are known in the art.) These three pairwise relationships may be used as a basis (either alone or in combination with other criteria) to recommend to users that items A, B, and C be purchased or otherwise acted on in combination. This recommendation is based on the inference or prediction that items A, B, and C are useful in combination, or are mutually complementary. The pairwise items relationships can also be used to form bundles of four or more items. An important aspect of this bundle formation method, in one embodiment, is that N-item bundles (where N is three or more) can be created without regard to whether or how often the N items are actually purchased in combination (although such information can be considered, if available). Thus, a greater number of N-item bundles can be identified reliably from a given set of purchase history data than would be possible by searching for purchases of all N items in combination. In addition, the bundles can be identified very efficiently in terms of processing resource utilization, as is desirable where the datasets are large (e.g., many millions of unique items and many millions of transactions).

In one embodiment, 3-item bundles are formed generally as follows. Given a primary or target item, the most related item is selected. Illustrations of how to determine which item is the most related item, or to rank related items, are given below. A third item is selected by determining if the third item is in the list of related items for both the primary item and the second item. In some embodiments, if there are multiple items that are related to both the primary item and the second item, then the third item that is most closely related to the primary item is selected for display to the user. In some embodiments, various algorithms for determining pairwise relationships can be used. Some illustrations of such algorithms are given below. In some embodiments pairwise relationship data is stored in a database or other computer storage. Relatedly, triples relationship data may be stored together with or separately from the pairwise relationship data.

When a bundle of the items is presented to the user, there may be an indication that the items are useful in combination or are often acted on together. Such suggestion of a bundle of items may be useful to the user by providing information about what products or related items other users have found important, necessary, or beneficial to act on together with the primary item.

II. Illustrative System (FIG. 1)

FIG. 1 illustrates one illustration of a system 30 in which the disclosed item selection methods can be employed, and illustrates components for implementing the item selection methods. In this particular embodiment, the items are catalog items represented in a browsable electronic catalog hosted by an Internet-accessible web site system. The Internet-accessible web site system may be composed of various types of networked computing devices (servers, load balancers, routers, disk arrays, etc.) that collectively operate as a machine. As will be apparent, the disclosed item selection methods are not limited to such an environment.

The system 30 includes a web server system 32 that generates and serves display pages, such as web pages, to computing devices 35 of end users. The computing devices 35 may, for example, include personal computers, personal digital assistants, mobile phones, set-top boxes for televisions, and other types of devices that run display or web browser software. The web server system 32 may be implemented as any number of physical servers/machines that run web server software. The web server system 32 may comprise one or more computers, servers, or machines and software to send, receive, and process web and other network traffic. The web server system 32 may also comprise other servers and systems that support the production of various display pages and web pages to computing devices 35.

The web server system 32 provides user access to an electronic catalog of items that are available via the system 30 for purchase, rental, and/or another form of action, such as those disclosed above. The items may include, for example, consumer electronics products; household appliances; book, music, and video titles in physical and/or downloadable form; magazine and other subscriptions; software programs; grocery items; and various other types of items that may be found in an electronic catalog. In a typical embodiment, many thousands or millions of unique items are represented in the catalog; thus, automation of the bundle formation process is desirable.

Figure 2:
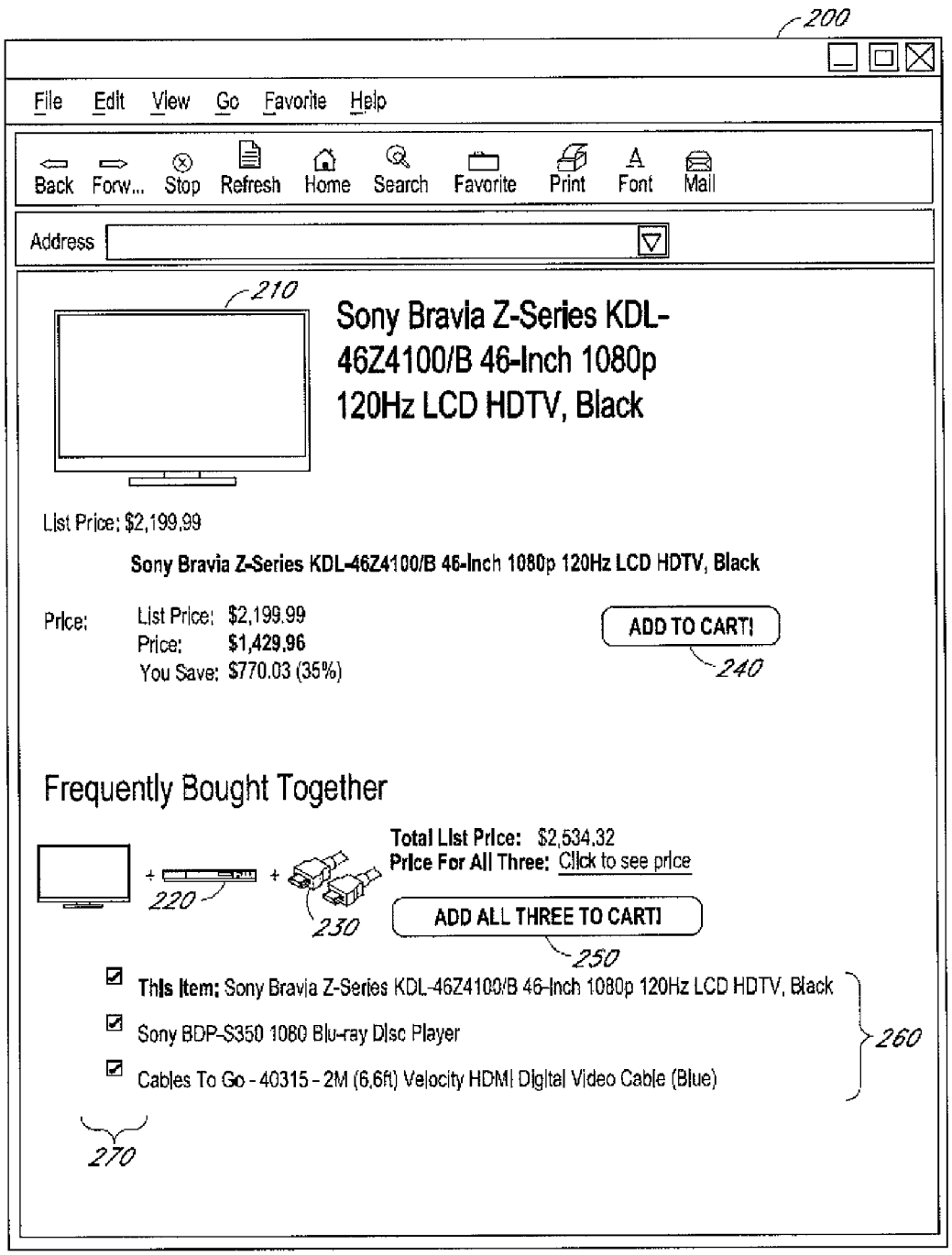
FIG. 2 illustrates one illustration of how suggested bundles of items generated by the system of FIG. 1 can be incorporated into an item detail page of an electronic catalog.
Figure 3:
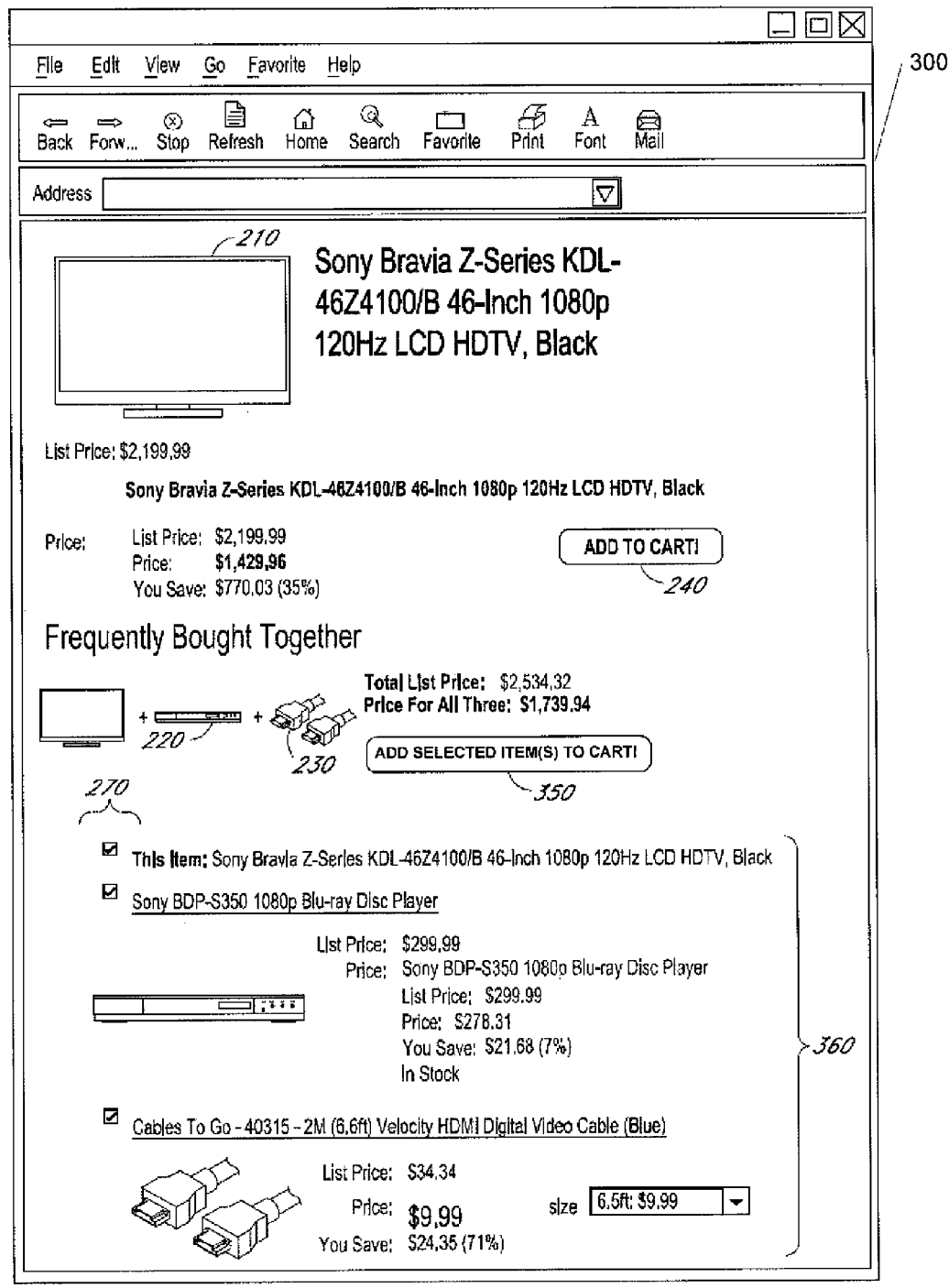
FIG. 3 illustrates another illustration of how suggested bundles of items generated by the system of FIG. 1 can be incorporated into an item detail page of an electronic catalog.

Detailed information about each item may be obtained by users by accessing the item's detail page within the catalog. To access an item's detail page, in one embodiment, a user selects a hyperlinked description of the item (e.g., on a category page, search results page, or recommendations page), or submits a search query that uniquely identifies the item. Thus, a user's access to an item's detail page generally represents an affirmative request for information about the item. Each item detail page may provide an option for the user to purchase the item; add the item to a shopping cart, wish list, or rental queue; bid on the item; pre-order the item; and/or perform another type of action-related action. Illustrations of this are depicted in FIGS. 2 and 3.

As users access item detail pages or web pages via the web server system 32, various types of the users' actions are recorded in a repository of user activity data 33 (also referred to as "event data"). For example, each item detail page access event and each item action event 40 (e.g., purchase, rental or license) may be recorded. The events may be captured together with event metadata, such as user identifiers, time/date stamps, session identifiers, etc., that may be used for item selection. The event data may be maintained in any appropriate format or formats (e.g., log files, databases, etc.). In addition, different types of event data may be stored separately from others (e.g., in different databases, records, files, etc.).

The web server system 32 generates requested catalog pages dynamically in response to requests from the computing devices 35. The item data included in the catalog pages (item description, price, availability, etc.) is retrieved from a catalog service 36, which accesses a repository 37 of item data. The content included in the catalog pages also includes various types of item association data retrieved from an item association service 41. For example, the web server system 32 may supplement item detail pages with lists of related items, and/or with suggestions of bundles of items to purchase in combination. The item action association data may be based on acquisition-based associations (e.g., "customers who buy A also buy B and C"), view-based associations (e.g., "customers who view D also view E and F"), and other types of item actions as discussed above. The item association data, which is stored in data repository 50, may include pairwise item action data, such as pairs table 47, 3-item bundle data, such as triples table 48, or other types of item association data. In the particular embodiment depicted in the drawings, the only types of item bundles generated and suggested to users are 2-item and 3-item bundles. As will be apparent (and as described below), the disclosed methods can also be used to generate and suggest bundles of 4 or more items. Thus, in some embodiments, the item association service 41 may generate and store information regarding bundles of four or more items. FIGS. 2 and 3, discussed below, are illustrations of 3-item bundles being offered or recommended on item detail pages of the catalog pages.

As further illustrated in FIG. 1, the item association service 41 includes a item bundle selection module 42 that generates, for a particular item, a bundle of related items, and includes pairwise mapping module 43 that identifies pairs of related items. Pairwise mapping module 43 may operate by analyzing collected event history data, and particularly item action histories 40. In one embodiment, the item action histories 40 are based on purchases and/or other types of transactions that involve the payment of money to purchase or obtain access to an item.

The item bundle selection module 42 is coupled to the data repository 50. The item bundle selection module 42 communicates with the data repository 50 in order to determine, given a primary or target item a bundle of suggested items to provide to the web server system 32 to display on a detail page, item detail page, or web page on computing device 35.

The pairwise mapping module 43 generates or updates a related pairs table 47. Each entry (depicted as a row) in this table 47 identifies two items that are acted on together (as part of the same transaction or session) by users. The pairwise module 43 may update the related pairs table 47 periodically (e.g., hourly, daily, or as relevant events occur) to reflect newly collected event data. The pairwise mapping analysis may optionally be performed such that greater weight is given to data collected from the most recent time period or periods. In some embodiments, pairwise mapping module 43 analyzes collected purchase history data on an aggregated basis (e.g., across many users) in an off-line processing mode to detect pairs of items that are related or acted on together. This involves calculating, for specific pairs of items, respective association or pairwise scores. The scores are then used to generate, for items, a respective ranked list of the most closely related items, or "related items list." A score threshold may be used to determine which items to include in the list. The scores for the related items may be stored together in pairs table 47. In some embodiments, the related items list in pairs table 47 may also be used to display to a user such information as "people who bought item A also bought item B . . . " and to generate personalize recommendations for particular users.

Related item lists can be determined using a number of methods. For example, in some embodiments, the pairs and scores are generating by periodically analyzing user purchase histories to identify correlations between purchases of items. The similarity between two items may be measured by determining the number of users that have an interest in both items relative to the number of users that have an interest in either item (e.g., items A and B are highly similar because a relatively large portion of the users that bought one of the items also bought the other item). The item-to-item mappings could also incorporate other types of similarities, including content-based similarities extracted by analyzing item descriptions or content. Some illustrations of similarity or relatedness score calculations are discussed in detail below.

The item bundle selection module 42 may operate in an offline fashion to identify and store bundles of related items by looking at the pairwise association data. Briefly, in some embodiments, the item bundle selection module 42 may operate, for a particular item A, by looking for a highly-ranked or highly associated item B and an item C, which is related to both item A and B as determined by looking at pairs table 47. This process and various related embodiments are discussed more below.

In some embodiments, although FIG. 1 depicts two separate modules 42 and 43, a single module or program may be used to concurrently perform the functions of both of the modules. Further, although two database tables 47 and 48 are shown in FIG. 1, the data may be stored in more than two tables or in conjunction with other data in a single table. Moreover, the data may be stored in a flat file, or any other appropriate format or structure.

The item association service 41 may include other modules and data structures used to mine and store data regarding other types of item relationships. In addition, the web site system 30 shown in FIG. 1 may include numerous additional services and components for performing various other types of tasks, such as executing item action transactions, executing search queries, maintaining user accounts, maintaining user wish lists, shopping carts and/or rental queues, authenticating users, supporting browsing of items by category, etc.

When a user requests an item detail page via a user computing device 35, the web server system 32 sends a service request to the item association service 41 requesting item association data for the corresponding item. Each item detail page ordinarily corresponds uniquely to a particular catalog item, although one or more related items may also be described on the page as in the illustrations shown in FIG. 3. If the requested item is part of a bundle of related items, then the service 41 returns the bundle of related items. For example, if the request is for the detail page for item A, the service 41 would return the bundle of two or more related items, e.g., items B and C, determined by the item bundle selection module 42. In one illustration, depicted in FIG. 3, the web server system 32 would also access the catalog service 36 to retrieve catalog data for item A (the featured item), and related items B and C, so that appropriate descriptions of these items may be included in the requested page. The web server system 32 may alternatively retrieve some or all of the foregoing types of data from a cache.

The bundle of suggested items may additionally or alternatively be incorporated into other types of catalog pages, including product pages of the type shown in FIGS. 2 and 3, search results pages, and category pages. In addition, this data may be communicated to users and other entities via email, RSS feeds, responses to web service calls, and other communication mechanisms.

In some cases, multiple versions or variations of a particular product may be treated as the same "item" for purposes of the analyses described herein. For example, the hardcover, paperback, audio, and/or electronic versions of a particular book title may be treated as the same item. For example, all color and/or memory-size variations of a particular Apple iPod model may be treated as the same item. All variations or versions of a product may, but need not, be described on a common item detail page for the product.

The catalog service 36 and the item association service 41 may each be implemented as a computer system that executes program code. Each such computer system may include any number of physical computers or machines, and may include computers that are geographically remote from one another. The various program modules may be stored on any type or types of computer storage system or computer-readable medium. The data repositories 33, 37 and 50 shown in FIG. 1 may be implemented as databases, flat file systems, and/or other types of storage systems, and may include magnetic disks, solid-state memories, and/or other types of storage devices. More generally, each of the illustrated components 32, 33, 36, 37, 41 and 50 may be implemented in any appropriate combination of computer hardware and software.

Although the item association service 41 is illustrated as part of a particular web site system 30 in FIG. 1, it could alternatively be implemented as a separate web service that supplies content that is displayed on many different distinct web sites. In such embodiments, the servers of such web sites may send collected user activity data to the item associate service 41 for analysis, and may send web service requests to the item association service to retrieve pairwise mapping data. In such multi-site embodiments, the related pairs may optionally be generated based on aggregated user activity data collected by a number of distinct and independently operated web sites.

III. Illustrative Web Pages (FIGS. 2-3)

FIG. 2 is an illustration of an item detail page 200, such as a webpage, that shows the details for purchasing a primary item 210, in this case an LCD television. On the item detail page 200 is listed information about the television including the name of the product, the list price, a discounted price, an indication of savings, and a suggested bundled item section 260. In the suggested bundled item section 260, there is an indication of two related items 220 and 230 that are suggested for action with the primary item (the LCD television). The related items 220 and 230 may be obtained using the method of FIG. 5. There may also be hyperlinks to the detail pages of each of the related items 220 and 230. By clicking on these links a user may find out more about the related items 220 and 230. The detail page for the related items 220 and 230 may also include other items that are related to that item, which will not necessarily contain either of item 210 or 220.

The item detail page 200 contains a selection mechanism such as a button 240 that allows a user to add the primary item 210 to a shopping cart. The item detail page 200 also contains a selection mechanism 250 that allows the user to add the entire three-item bundle 260 (e.g., the primary item 210 and related items 220 and 230) to the shopping cart. An item deselection section 270, which includes checkboxes in this illustration, enables the user to deselect one or more of the items such that only a subset of the bundle is added to the cart when selection mechanism 250 is selected. As explained below, this de-selection mechanism enables the system to collect user feedback data reflective of whether particular bundle suggestions are useful. In some embodiments, if one or more of the items 210, 220, or 230 is unselected, then the text displayed in selection mechanism 250 will change to reflect that only one or two of the items 210, 220, or 230 will be added to the cart. Various other controls (not shown) may be provided on the page 200 for performing other functions; for example, a button may be provided for instantly purchasing the bundle of items without the use of a shopping cart.

FIG. 3 is an illustration of an item detail page 300 that shows a detail page for a primary item 210. FIG. 3 is similar to FIG. 2 and like numbers represent like portions of the item detail pages 200 and 300. A difference on page 300 is that selection mechanism 350 has text that does not need to be updated based on the number of related items 210, 220, and 230 that are selected. Further, the suggested bundled item section 360 not only includes a deselection mechanism 270 in which one or more of items 210, 220, and 230 can be deselected before acting on the other items 210, 220, and/or 230, but also includes detail about each of the related items 220 and 230.

As will recognized, the messaging used to offer or suggest the bundles of items can vary from that shown in FIGS. 2 and 3. For example, rather than the text "frequently bought together," the page may display "recommended together," "recommended as a bundle," "better together," or "useful in combination." In addition, the page may offer the bundle at an automatically-calculated discount relative to the combined price of the three items, or may offer another type of bundle purchase incentive such as free shipping. Further, the bundle may be displayed together with automatically-generated statistical data reflective of one or more of the following: (1) how often users respond favorably to the bundle suggestion, (2) how often users who make a purchase via this detail page purchase the entire bundle, (3) how often users deselect particular items when responding to the bundle selection.

IV. Process for Generating a Table of Bundles of Three Related Items (FIG. 4)

Figure 4:
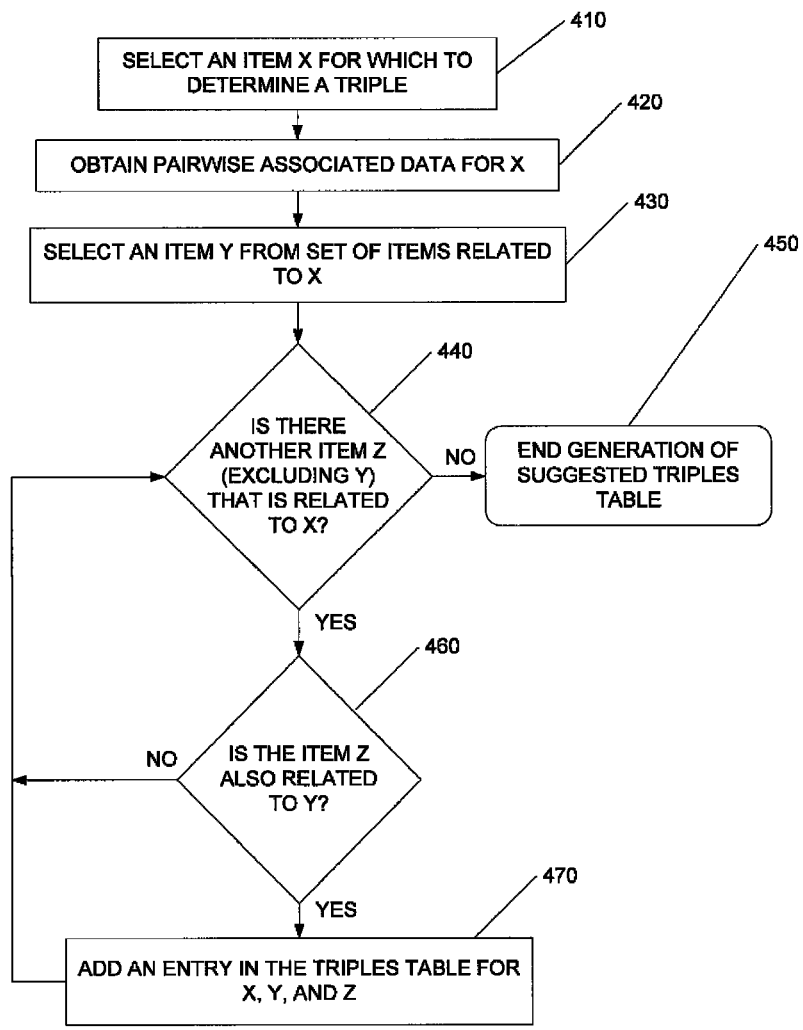
FIG. 4 depicts an illustrative method of producing a bundle of items to suggest in combination.

FIG. 4 depicts a process for generating a table of suggested bundles of three related items, such as table 48 from FIG. 1. These steps may be performed, for example, by an item bundle selection module 42 in FIG. 1. After an item X, for which a bundle of three related items will be determined, is selected in step 410, then in step 420 item-to-item or pairwise data associated with item X is obtained. For example, referring again to FIG. 1, this data may be stored in table 47. There are a number of ways that this pairwise data may be obtained in order for it to be stored in table 47 of FIG. 1. For example, FIGS. 3 and 4 of and the associated description in U.S. Pat. No. 6,266,649 describe one manner for calculating relative associative ranks for items (Y1, Y2, Y3, etc) that are related to item X. These related items, and any associated rankings, can be added to a pairs table, such as table 47, by a pairwise mapping module 43, as depicted in FIG. 1. Another illustration of producing relative associative ranks for items (Y1, Y2, Y3, etc) that are related to a particular item is presented below.

In one embodiment, when calculating the association score for a given item pair (X, Y), a user's action on both X and Y is counted (e.g., the purchases positively contribute to the score) only if a nexus exists between these two actions. A nexus may be deemed to exist if, for example, one or more of the following conditions exist: (1) the two actions occurred within predefined time period of each other (e.g., 1 hour, 1 day, 1 week, or 1 month), (2) the two actions occurred during the same browsing session, (3) the two actions occurred without an intervening action by the user. In one implementation, a nexus requirement is imposed by dividing the collected action history data into 1-day segments, and by analyzing each segment separately. In some embodiments, however, the two actions will constitute a pairwise association regardless of the time or number and type of events that occur between the two actions. In other embodiments, the association scores may be calculated without regard to whether a nexus exists between particular purchases of a user.

After the pairwise item action data for item X is obtained, then in step 430 an item Y is selected from among all of the items associated with item X. In some embodiments, the top or highest ranked associated item from among those associated with item X is chosen. The ranking of the various associated items with item X may be based on the association score, as discussed above. Another metric or other metrics could also be used to pick the item Y from among the items associated with item X.

After selecting item Y, in step 430, then in step 440 a determination is made as to whether there is another item, item Z, that is related to item X. If there is an item Z that is related to item X, then in step 460, a determination is made as to whether item Z is also related to item Y. If item Z is related to item Y, then in step 470 an entry is added to the triples table for the triple of item X, item Y, and item Z. The adding of bundle {X, Y, Z} to the triples table may be made without regard to whether items X, Y, and Z have ever been purchased in combination. If a new entry is added in step 470 to the triples table, then the process returns to step 440 to check again for another item Z that is related to item X. Returning now to step 440, if it is determined that there is no additional item Z that is related to item X, then the process for determining suggested triples for item X terminates in step 450.

As will be recognized, this method may be extended to enable bundles of four or more items to be automatically generated. As an illustration of this, pseudocode for generating a bundle of four related items is shown below.

In some embodiments, price, categorization, manufacturer, and/or other attributes of the items may be used as an additional factor to determine whether a set of items should be recommended as a bundle. For example, if one of the three items is significantly higher in price than the other two, then this may be an appropriate bundle as it may represent a primary item with two accessory items. As another example, if one of the three items is categorized in a primary category and the other two items are categorized in a related accessory category, then this bundle may be appropriate as it may represent a primary item and two related accessories.

More generally, a variety of criteria may be considered in automatically determining whether particular bundles identified via the process of FIG. 4 should actually be suggested. For example, a given bundle may be effectively filtered out (blocked from being suggested) if one or more of the following conditions is satisfied: (1) the attributes of the bundle's items suggest that the items likely are not mutually complementary; (2) user feedback on the bundle, as may be collected via the de-selection option described above, is generally negative; (3) purchase history data reveals that users who view/consider all three items during a browsing session very rarely purchase all three.

A process for producing tables of triples might also be accomplished by the following pseudocode:

```
For every item X
  relatedX=list of items related to item X;
  For every item Y in relatedX;
    relatedY=list of items related to item Y;
    For every item Z in relatedX (excluding item Y)
      If Z in relatedY, then includeTriple(X,Y,Z);
    Done;
  Done;
Done;
```

If the goal were to produce a table of bundles of four related items, the following pseudocode may be useful:

```
For every item X
  relatedX=list of items related to item X;
  For every triple (X,Y,Z) present in the triples table
    relatedY=list of items related to item Y;
    relatedZ=list of items related to item Z;
    For every item W in relatedX (excluding item Y and item Z)
```

If W in relatedY and relatedZ, then includeQuadruple
                (X, Y, Z, W);
        Done;
    Done;
Done;

V. Process for Selecting Related Items to Display Together (FIG. 5)

Figure 5:
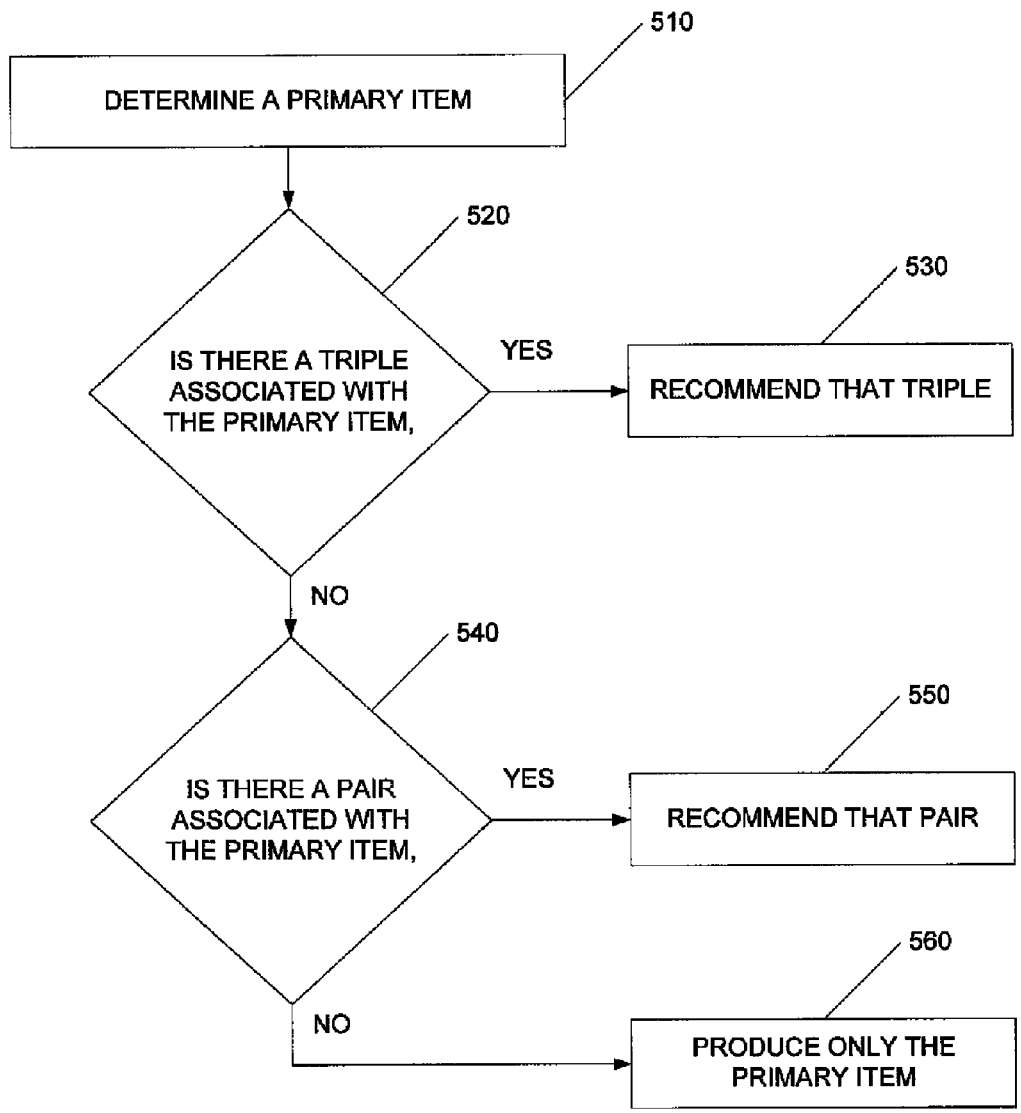
FIG. 5 depicts an illustrative process for producing a product page that may have suggested bundles of items information incorporated, such as the product detail pages in FIGS. 2 and 3.

FIG. 5 depicts a process of selecting related items to display on a page with a primary item. Once a primary item is indicated in step 510, a decision is made in step 520 to determine whether there is a bundle of three related items including the primary item. This determination may be performed, for example, with the item association service 41 of FIG. 1. If there is a bundle of three related items including the primary item, then that bundle of three related items is selected for recommendation in step 530. If there is no bundle of three related items including the primary item, then, in step 540, it is determined whether there is a pair of two related items which includes the primary item. If there is a pair of two related items that includes the primary item, then, in step 550, the pair of two related items including the primary item is selected for recommendation. If there is no pair of two related items including the primary item, then, in step 560, there is no bundle or pair of related items selected for recommendation to the users. The display of suggested items may be performed, for example, by the web server system 32 to a computing device 35, as depicted in FIG. 1. Illustrative embodiments of determining bundles of three related items including the primary item are discussed below.

In some embodiments, if there is more than one bundle of three related items that include the primary item, then the bundle of three related items that is of the highest rank is selected for recommendation. Determining the relative ranks for the bundle of three related items may include looking at how closely related the items in the set are with the primary item. For example if there are two bundles of three related items that include a primary item X, bundle of related items {X, Y, Z} and bundle the related items {X, Y, W}, and the relative ranks of those two related items may be determined by looking at how related X and Z are and looking at how related X and W are. If X and Z are more related than X and W, then {X, Y, Z} is chosen for recommendation. Determining how related two items are is discussed in more detail herein.

Choosing among candidate bundles of related items may also include determining whether there is data showing that various pairs of items are incompatible. This information may be obtained by looking at its negative feedback received from recommended bundles of related items. For example, if a bundle of three related items {X, Y, Z} were suggested to a user and the user deselected one of the items, for example item Z, then that information may be used to determine that item Z should not be suggested with item X. Therefore, as a filter on the suggestion of certain triples in step 520 and pairs in step 540, the system or process may also check to make sure that the pair or triple that is about to suggest does not include an incompatible pair.

The filtering of incompatible pairs may include looking up incompatible pairs in a table or file. In some embodiments, this table or file of incompatible pairs may be produced using the pseudocode below:
  1. Obtain data on all times that a triple was suggested and only two items were acted on using the recommended items list, such as suggested bundled item sections 260 and 360 in FIGS. 2 and 3, respectively.
  2. For each such event corresponding to the triple (X, Y, Z), generate a file INCOMPATIBLE containing pairs of items such that
      i. if (X, Y) were added to cart, add {Y Z} to the INCOMPATIBLE file.
      ii. if (X, Z) were added to cart, add {Y Z} to the INCOMPATIBLE file.
      iii. if (Y Z) were added to cart, ignore.
  3. Sort the INCOMPATIBLE file and build a histogram so that we have
      i. Y->Z1,n1: Z2,n2: . . . :Zk, nk, where:
      ii. n1=number of times Z1 appears incompatible to Y
      iii. n2=number of times Z2 appears incompatible to Y 1
      . . . .
      iv. nk=number of times Zk appears incompatible to Y
  4. Use a threshold MIN-OCCURRENCE.
  5. Add (Y, Zt) to the stoplist file (used in filtering similarities) if the incompatibility score nt>MIN-OCCURRENCE One of ordinary skill in the art can appreciate that this process can be adapted to use a database table instead of a file. One of ordinary skill in the art can also appreciate that a similar process can be used to find incompatible pairs or sets of any size for recommended pairs, recommended bundles of four, etc. Example values for MIN-OCCURENCE include 1, 2, 10, and 100.

One of ordinary skill in the art can adapt the process of FIG. 5 for any size bundle of related items. For example, a check could be made after step 510 and before step 520 to determine whether there is a bundle of four related items associated with the primary item. If there is a bundle of four related items associated with the primary item, then that bundle of four related items could be selected for recommendation. Otherwise, the process would continue to step 520 to determine whether there was a bundle of three associated with the primary item and the process would continue as described above.

VI. Illustrative Rankings for Associated Items

This section describes a few of many possible processes that can be used to generate association scores for related items based on collected purchase history data of a population of users. Some other possible processes for generating association scores are discussed above. Below is described an illustration of producing relative associative ranks for items (Y1, Y2, Y3, etc) that includes looking at the selection of the pairs of items X and Y and the probability that a user would select items X and Y by random chance. If P(Y) is the probability that a user purchases item Y and P(Y|X) is the probability that a user will purchase Y given that the user purchased item X, then the degree to which X is associated with, or is similar with, Y could be represented as follows:

$$P(Y|X) - P(Y)$$

where P(Y) may be calculated as the (number of people who bought item Y)/(the total number of customers). One might also multiply P(Y) by an adjustment factor in order to improve the similarity or association score:

$$P(Y|X) - P(Y) * \text{AdjustmentFactor}(Y).$$

As another illustration, where $P(Y|X)_{observed}$ is the actual observed number of times that users did purchase item Y with item X and $P(Y|X)_{estimated}$ is the estimate likelihood that a user would purchase item Y with item X by random chance, then the relative association of items may be:

$$P(Y|X)_{observed} - P(Y|X)_{estimated}.$$

Similarity can also be calculated as:

$$\frac{|X \cap Y|}{|X|} - P_{unit}(Y) * \frac{\sum_{C \in Xset} |C|}{|X|}.$$

where $|X \cap Y|$ is the number of users that bought X and Y together, $|X|$ is the number of users that bought X, C is a single user of the set of users that bought X ("$X_{set}$"), $|C|$ is the total number of items that user C has purchased (including X, Y, and an other items), $P_{unit}(Y)$ is the probability that any given purchase of any product in the catalog is a purchase of Y, and, as noted, the sum is taken over all of the users C that are in the set of users that bought X. $P_{unit}(Y)$ may be calculated as:

$$\frac{\text{\# units of } Y \text{ purchased by all users}}{\text{Total \# units in the catalog purchased}}$$

Further, $|X \cap Y|$ can be estimated as $$\sum_{n=1}^{\infty} (-1)^{(n+1)} * COCA_n(X) P_Y^n,$$

where $$COCA_n(X) = \sum_{C \in Xset} \binom{|C|}{n}.$$

Other illustrations for rankings of association of two items are:

$$\frac{|X \cap Y|}{|X|}, \frac{|X \cap Y|}{\sqrt{|X|}}, \text{ and } \frac{|X \cap Y|}{\sqrt{|X|}\sqrt{|Y|}}.$$

Additionally, in some embodiments, data from older action pairs can be "decayed." That is, when calculating pairwise item action data from older scores, greater weight may optionally be given to the most recent purchases. This may be accomplished by, for example, applying a linear or exponential decay function to the collected purchase data. For example, each pairwise association may be weighted with a decay-coefficient such as:

decay-coefficient=exp((−log(2)/half-life)*age-in-days)

where the half-life may be, for example, ninety days. In such embodiments, X sales today may be weighted similarly with 2× sales half-life days ago. The variable for decay may also be age in any other unit, such as hours, half-days, weeks, months, etc. Although an exponential decay function is shown in this embodiment, other decay functions, such as linear, polynomial, etc. may also be used. Further, other weighting functions might also be used.

VII. Conclusion

As will be apparent, the features and attributes of the specific embodiments disclosed above may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and fully automated via, software code modules executed by one or more general purpose computers or processors. The code modules, including modules 42 and 43 depicted in FIG. 1, may be stored in any type of computer-readable medium (e.g., solid state RAM, magnetic disks, etc.) or computer storage device. Some or all of the methods may alternatively be embodied in specialized computer hardware.

It should be emphasized that many variations and modifications may be made to the above-described embodiments, the elements of which are to be understood as being among other acceptable illustrations. All such modifications and variations are intended to be included herein within the scope of this disclosure and protected by the following claims.

What is claimed is:

1. A computer-implemented method of selecting items to include in item bundles, the method comprising:

maintaining purchase data in computer storage, said purchase data reflective of item purchases of each of a plurality of users;

detecting pairwise purchase relationships between particular items based, at least in part, on how frequently particular items are purchased in combination by users, as determined by analyzing said purchase data;

identifying, based on the detected pairwise purchase relationships, a set of three pairwise purchase relationships said set composed of a pairwise purchase relationship between a first item and a second item, a pairwise purchase relationship between the first item and a third item, and a pairwise purchase relationship between the second item and the third item, said first, second and third items each having a respective item detail page in an electronic catalog; and based on at least the identified set of three pairwise purchase relationships, supplementing the item detail page of the first item with (1) a description of a three-item bundle composed of the first, second and third items, and (2) an option to select the three-item bundle for purchase;

wherein the method, including maintaining the purchase data, detecting the pairwise purchase relationships, identifying the set of three pairwise purchase relationships, and supplementing the item detail page, is performed programmatically by a computerized system that comprises one or more physical computing devices.

2. The method of claim 1, wherein the method comprises programmatically inferring that the first, second, and third items are suitable for inclusion in the bundle based on said pairwise purchase relationships between the first and second items, first and third items, and second and third items.

3. The method of claim 1, wherein identifying the set of three pairwise purchase relationships comprises:
identifying a first plurality of items that each have a pairwise purchase relationship with the first item;
identifying a second plurality of items that each have a pairwise purchase relationship with the second item; and
determining that said third item is included in both said first plurality of items and said second plurality of items.

4. The method of claim 1, wherein the step of supplementing the item detail page of the first item is performed without regard to how frequently the first, second, and third items are actually purchased in combination.

5. The method of claim 1, wherein the step of supplementing the item detail page is performed based further on a determination that attributes of the first, second and third items do not satisfy a set of bundle exclusion criteria.

6. The method of claim 1, further comprising collecting feedback data regarding user responses to recommendations of said three-item bundle, and taking said feedback data into consideration to determining whether to continue to recommend said three-item bundle.

7. The method of claim 1, wherein the option to select the three-item bundle for purchase comprises a control that is selectable by a user to add the first, second and third items collectively to an electronic shopping cart.

8. The method of claim 7, further comprising adding the first, second and third items to an electronic shopping cart in response to user selection of said control.

9. A system for selecting items to include in bundles, the system comprising:
a data storage system that stores purchase data reflective of item purchases of each of a plurality of users; and
a computer system comprising one or more physical computing devices, said computer system programmed to implement a process that comprises:
detecting pairwise purchase relationships between particular items based, at least in part, on how frequently particular items are purchased in combination by users, as determined by analyzing said purchase data;
identifying, based on the detected pairwise purchase relationships, a set of three pairwise purchase relationships, said set composed of a pairwise purchase relationship between a first item and a second item, a pairwise purchase relationship between the first item and a third item, and a pairwise purchase relationship between the second item and the third item, said first, second and third items each having a respective item page in an electronic catalog; and
based at least partly on the identified set of three pairwise purchase relationships, causing the item page of the first item to be supplemented with (1) a description of a three-item bundle composed of the first, second and third items, and (2) an option to select the three-item bundle for purchase.

10. The system of claim 9, wherein the computer system is programmed to cause the item page to be supplemented with said description and option without regard to how frequently the first, second and third items are actually purchased in combination.

11. The system of claim 9, wherein the computer system is programmed to identify the set of three pairwise purchase relationships by a process that comprises:
identifying a first plurality of items that each have a pairwise purchase relationship with the first item;
identifying a second plurality of items that each have a pairwise purchase relationship with the second item; and
determining that said third item is included in both said first plurality of items and said second plurality of items.

12. The system of claim 9, wherein the computer system is additionally programmed to analyze attributes of the first, second and third items to assess whether the first, second and third items are suitable for inclusion in the three-item bundle.

13. The system of claim 12, wherein said attributes include respective prices of the first, second and third items.

14. The system of claim 12, wherein said attributes include respective categorizations of the first, second and third items.

15. The system of claim 9, wherein the computer system is additionally programmed to use implicit user feedback on the three-item bundle to assess whether to continue causing said item page to be supplemented with said description and option.

16. The system of claim 9, wherein the option to select the three-item bundle for purchase comprises a control that is selectable by a user to add the first, second and third items collectively to an electronic shopping cart.

17. The system of claim 9, wherein the computer system is responsive to user selection of said control by adding the first, second and third items to the electronic shopping cart.

\* \* \* \* \*

UNITED STATES PATENT AND TRADEMARK OFFICE
CERTIFICATE OF CORRECTION

| | | |
|---|---|---|
| PATENT NO. | : 8,438,052 B1 | Page 1 of 1 |
| APPLICATION NO. | : 12/426441 | |
| DATED | : May 7, 2013 | |
| INVENTOR(S) | : Chanda et al. | |

It is certified that error appears in the above-identified patent and that said Letters Patent is hereby corrected as shown below:

In the Claims:

Claim 1, in column 12 at line 50, replace "relationships" with --relationships,--.

Signed and Sealed this
Eighth Day of October, 2013

Teresa Stanek Rea
*Deputy Director of the United States Patent and Trademark Office*